Dec. 8, 1936.  M. GREENE ET AL  2,063,432
KITCHEN UTENSIL
Filed Aug. 16, 1935
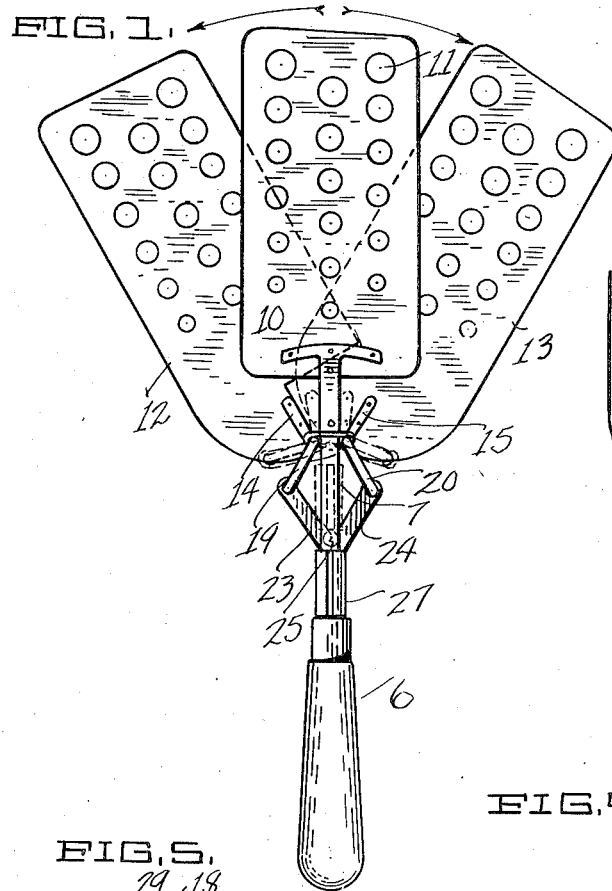
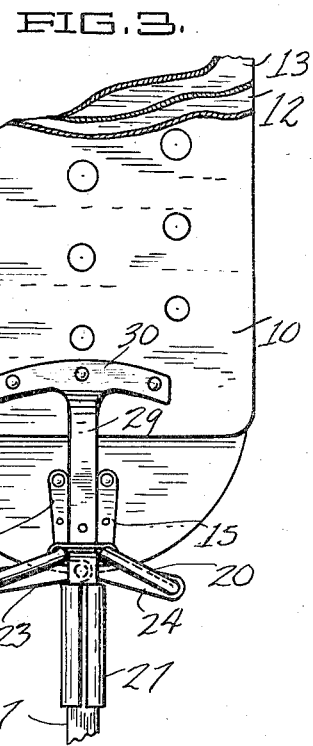
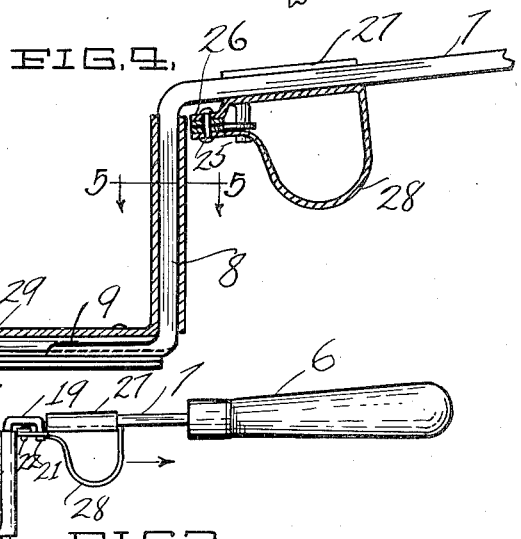
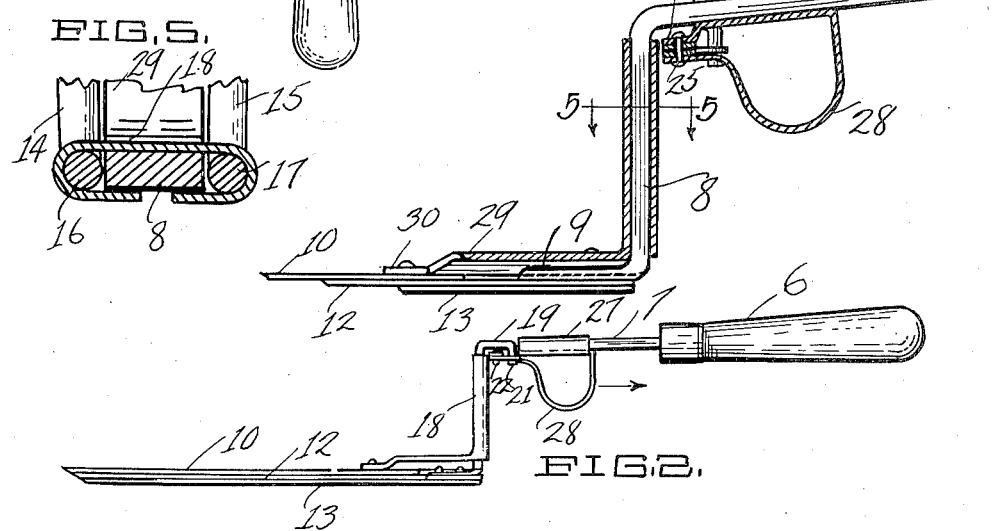
INVENTORS
MINNIE GREENE.
LOIS UDEY.
BY Victor J Evans Co
ATTORNEYS Patented Dec. 8, 1936

2,063,432

UNITED STATES PATENT OFFICE 2,063,432

KITCHEN UTENSIL

Minnie Greene and Lois Udey, El Segundo, Calif.

Application August 16, 1935, Serial No. 36,601

3 Claims. (Cl. 294—7)

This invention relates to improvements in kitchen utensils and has particular reference to an implement adapted for use in lifting meats or fowl from pans or roasters, in turning cakes, and other varied uses in the culinary art.

The principal object of the invention is to provide means whereby certain of the blades of the device are movable or adjustable with relation to a third stationary blade, thus increasing the lifting area of the implement, so as to permit the same to be readily adapted for use in lifting food products or the like of different sizes and varying dimensions.

A further object of the invention is to provide a device of the character described that is provided with means whereby the blades of the device may be retained or locked in nested position when only a limited lifting surface or area is necessary.

A further object of the invention is to produce an implement that is simple in construction, economical to manufacture, highly efficient in use, durable, and exceedingly sanitary.

Other objects and advantages will be apparent during the course of the following description.

In the accompanying drawing forming a part of this specification and in which like numerals are employed to designate like parts throughout the same, Fig. 1 is a top plan view of the device with the end blades shown in extended position.

Fig. 2 is a side elevation of the device.

Fig. 3 is a similar view of an enlarged scale showing the blades in nested position with a portion of the blades and handle being broken away.

Fig. 4 is a fragmentary sectional view on an enlarged scale illustrating to advantage the means for retaining the blades in nested position, and Fig. 5 is a horizontal section through the sleeve and shank of the device, the view being taken on a line 5—5 of Fig. 4.

We are aware of the fact that various types of food lifting devices have been previously patented, but these do not, to our knowledge, employ movable or adjustable blades whereby the lifting surface or area of the blades is increased. It frequently happens that in the use of a lifting device, as for instance a hotcake turner, the dimensions of the blade are so small that a proper turning or raising of the food products cannot be accomplished. By virtue of the construction of our device we are enabled to readily, positively and safely lift or turn food products such as roast or fowl by simply moving or adjusting certain of the blades with relation to a third stationary blade.

In the accompanying drawing wherein for the purpose of illustration is shown a preferred embodiment of our invention, the numeral 6 designates the wooden handle of the device in which is positioned a shank or extension 7 bent substantially at right angles to provide an offset 8 and then bent again at right angles to provide a foot portion 9. To said foot portion there is secured the middle or stationary blade 10. As disclosed to advantage in Fig. 1 it will be noted that the blade 10 which is preferably perforated as at 11 is of a smaller dimension than the movable side blades 12 and 13. The side blades 12 and 13 have riveted thereto foot portions 14 and 15, of arms 16 and 17, that are bent at right angles to said foot portions and are positioned on the opposite sides of the offset 8, the arms being retained in position by a clamp or sleeve 18. The said arms are then bent at right angles to form extensions 19 and 20 having downwardly turned ends 21 and 22 to which are connected the ends of links 23 and 24 the opposite ends of the links, in turn being secured by pintle 25, to a lip 26 of a sleeve or slider 27 that is movable over the shank 7. The slider is equipped with a finger hold 28 which is likewise retained in position by the pintle 25. The operation of our device is as follows:

When it is desired to move the blades from their normally nested position of Fig. 3 to the adjusted position of Fig. 1 it is only necessary for the operator to grasp the handle in his hand and insert the index finger through the finger hole or loop 18. A rearward movement imparted to the finger hold will cause the slider to move rearwardly on the shank 7. The links 23 and 24 being connected at their respective ends to said slider and to the extensions 19 and 20 of the arms 16 and 17 will cause said extension to assume the position illustrated in Fig. 1 and the foot pieces 14 and 15 will in turn actuate the end blades 12 and 13 to thus move the same to the position of the blades illustrated in Fig. 1.

When it is desired to nest the blades, the forward movement is imparted to the finger hold which in turn actuates the slider and causes the links to move beyond dead center until they assume the position illustrated in Fig. 3. The said links being beyond center cannot be readily released until a rearward movement is imparted to the slider, thus there is small danger of accidental displacement of the blades from their nested position, when the device is used as a conventional hotcake lifter.

The blades as shown are preferably rectangular in form and may be made of spring or stainless steel. It is obvious that when the blades are open the surfaces are exposed so that they can be readily cleaned.

To make the tool most durable and sturdy the clamp 18 may be provided with a foot piece 29 that terminates in a cross strip 30 which is in turn riveted to the stationary blade 10.

While we have recited certain definite uses of the article it is obvious that it has an unlimited number of adaptations in the culinary art.

From the foregoing description, considered in connection with the accompanying drawing, it will be obvious that we have devised an inexpensive and practical implement that will readily accomplish the objects set forth.

It is to be understood that the form of our invention herewith shown and described is to be taken as a preferred example of the same and that various changes relative to the material, size, shape and arrangement of parts may be resorted to without departing from the spirit of the invention or the scope of the subjoined claims.

Having thus described our invention, we claim:—

1. In a food lifting device, a shank carrying a handle, a plurality of blades offset with relation to said shank, each of said blades being positioned in an individual plane below the plane of said shank, said blades including a fixed blade and a pair of end blades, a slider movable over said shank and interconnected with said blades, whereby upon movement of said slider along said shank an expansion or contraction of the blades will be effected.

2. In a food lifting device, a shank carrying a handle, a plurality of blades offset with relation to said shank, each of said blades being positioned in an individual plane below the plane of said shank, said blades including a fixed blade and a pair of end blades, a slider movable over said shank and interconnected with said blades and means cooperating with said blades for moving the end blades laterally with relation to said fixed blade, said means including a pair of links adapted to be moved beyond dead center to retain the movable blades in alignment with respect to said stationary blade.

3. In a food lifting device, a shank carrying a handle, an offset provided in said shank, a stationary blade connected to said shank, a pair of movable arms positioned adjacent said shank, a pair of blades connected to the foot extremities of said arms, a slider movable over said shank and interconnected with said blades, links connected to said slider and to the upper extremities of said arms, whereby upon actuation of said slider the end blades are adapted to move laterally with respect to said fixed blade.

MINNIE GREENE.
LOIS UDEY.